(12) United States Patent
Tseng et al.

(10) Patent No.: US 11,846,791 B2
(45) Date of Patent: Dec. 19, 2023

(54) COMPOUND PRISM MODULE AND IMAGE ACQUISITION MODULE

(71) Applicant: GUANGZHOU LUXVISIONS INNOVATION TECHNOLOGY LIMITED, Guangzhou (CN)

(72) Inventors: Cheng-Te Tseng, Guangzhou (CN); Yu-Yan Su, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 12 days.

(21) Appl. No.: 17/688,145

(22) Filed: Mar. 7, 2022

(65) Prior Publication Data

US 2022/0187512 A1    Jun. 16, 2022

(30) Foreign Application Priority Data

Apr. 21, 2021   (CN) .......................... 202110429870.0

(51) Int. Cl.
| | |
|---|---|
| *G02B 5/04* | (2006.01) |
| *G02B 7/18* | (2021.01) |
| *G03B 37/04* | (2021.01) |

(52) U.S. Cl.
CPC ........... *G02B 5/045* (2013.01); *G02B 7/1805* (2013.01); *G03B 37/04* (2013.01)

(58) Field of Classification Search
CPC ....... G02B 5/045; G02B 7/1805; G03B 37/04
USPC .................................................. 359/833, 834
See application file for complete search history.

(56) References Cited

U.S. PATENT DOCUMENTS

| | | | | | |
|---|---|---|---|---|---|
| 2,006,509 | A | * | 7/1935 | Myers ..................... | A47J 37/08 |
| | | | | | 359/834 |
| 2,317,988 | A | * | 5/1943 | Carl ......................... | G02B 5/04 |
| | | | | | 359/834 |
| 2,406,798 | A | * | 9/1946 | Burroughs ................ | G01S 1/02 |
| | | | | | 342/429 |
| 3,597,702 | A | * | 8/1971 | Dumanchin ............ | H01S 3/081 |
| | | | | | 372/100 |

(Continued)

FOREIGN PATENT DOCUMENTS

| | | | |
|---|---|---|---|
| CN | 102012627 | * | 4/2011 |
| CN | 104034729 | * | 9/2014 |
| CN | 209895095 | * | 1/2020 |

*Primary Examiner* — Ricky D Shafer
(74) *Attorney, Agent, or Firm* — Birch, Stewart, Kolasch & Birch, LLP

(57) ABSTRACT

A compound prism module is provided, including a first prism and a second prism. The first prism includes a first light-incident surface, a first reflecting surface, and a first light-emergent surface connected to each other, where the first light-incident surface and the first light-emergent surface are connected to each other on a first side edge. The second prism includes a second light-incident surface, a second reflecting surface, and a second light-emergent surface connected to each other, where the second light-incident surface and the second light-emergent surface are connected on a second side edge. The first light-incident surface and the second light-incident surface are connected to each other and are coplanar, the first reflecting surface and the second reflecting surface are connected on a third side edge, there is a spacing between the third side edge and a connection between the first light-incident surface and the second light-incident surface.

16 Claims, 8 Drawing Sheets

(56) References Cited

U.S. PATENT DOCUMENTS

| | | | |
|---|---|---|---|
| 7,139,125 B1* | 11/2006 | Mi | G02B 6/0056 |
| | | | 359/833 |
| 8,139,125 B2* | 3/2012 | Scherling | H04N 23/55 |
| | | | 348/335 |
| 9,374,516 B2* | 6/2016 | Osborne | G02B 7/09 |
| 10,511,832 B1* | 12/2019 | Shen | H04N 13/344 |
| 2008/0012034 A1* | 1/2008 | Thielen | G02B 27/0972 |
| | | | 257/E33.073 |
| 2009/0009686 A1* | 1/2009 | Obata | G02F 1/133604 |
| | | | 349/64 |
| 2021/0185226 A1* | 6/2021 | Yen | G01J 3/2823 |
| 2022/0187513 A1* | 6/2022 | Tseng | G02B 5/04 |

* cited by examiner

COMPOUND PRISM MODULE AND IMAGE ACQUISITION MODULE

CROSS-REFERENCE TO RELATED APPLICATION

This non-provisional application claims priority under 35 U.S.C. § 119(a) to Patent Application No. 202110429870.0 filed in China on Apr. 21, 2021, the entire contents of which are hereby incorporated by reference.

BACKGROUND

Technical Field

The present disclosure relates to a biprism structure, and in particular, to a compound prism module and an image acquisition module to which the compound prism module is applicable.

Related Art

In cases in which wide-angle photography is required for image acquisition, to avoid image distortion caused by single-large-field-of-view image acquisition, a biprism structure is used for image acquisition. After being respectively acquired by using two prisms, small-field-of-view images are processed and spliced by a backend into a large-field-of-view image.

To reduce the width of the biprism structure, corresponding edges and corners of the two prisms are cropped, and the two prisms are connected to each other by an optical adhesive, to form a seam between the two prisms. A type of optical adhesive with optical properties (especially the refractive index) close to optical properties of the prisms is selected as the foregoing optical adhesive. However, bubbles, uneven adhesive application, excess adhesive overflowing, lack of adhesive, or the like is likely to occur in the optical adhesive bonding process, which causes the problem of medium change. As a result, light rays passing through the seam pass through media (the optical adhesive, air, and the prisms) having different optical properties and are refracted for a plurality of times, resulting in the problem of flare in image acquisition results. In addition, the uneven application of the optical adhesive also affects the adhesion between the two prisms, causing a light-incident surface jointly formed by the two prisms to be bent and deformed.

SUMMARY

In view of the above problems, the present disclosure provides a compound prism module and an image acquisition module to which the compound prism module is applicable, to avoid the occurrence of flare.

At least one embodiment of the present disclosure provides a compound prism module, including: a first prism and a second prism. The first prism includes a first light-incident surface, a first reflecting surface, and a first light-emergent surface connected to each other, where the first light-incident surface and the first light-emergent surface are connected to each other on a first side edge. The second prism includes a second light-incident surface, a second reflecting surface, and a second light-emergent surface connected to each other, where the second light-incident surface and the second light-emergent surface are connected to each other on a second side edge.

The first prism and the second prism are integrally formed, the first light-incident surface and the second light-incident surface are connected to each other and are coplanar, the first reflecting surface and the second reflecting surface are connected to each other on a third side edge, there is a spacing between the third side edge and a connection between the first light-incident surface and the second light-incident surface, and the first side edge and the second side edge are parallel to each other and far away from each other.

In the at least one embodiment of the present disclosure, the first reflecting surface and the second reflecting surface are provided with reflective coatings.

In the at least one embodiment of the present disclosure, there is a first angle between the first light-incident surface and the first reflecting surface, there is a second angle between the second light-incident surface and the second reflecting surface, there is a third angle between the first reflecting surface and the second reflecting surface, and a sum of the first angle, the second angle, and the third angle is 180 degrees.

In the at least one embodiment of the present disclosure, the compound prism module further includes: a prism holder, including a bottom surface and a first inclined side surface and a second inclined side surface extending from two opposite side edges of the bottom surface, where the second reflecting surface is fixed to the second inclined side surface, and the first reflecting surface is fixed to the first inclined side surface.

In the at least one embodiment of the present disclosure, the third angle between the first reflecting surface and the second reflecting surface is equal to an angle between the first inclined side surface and the second inclined side surface.

In the at least one embodiment of the present disclosure, the first inclined side surface and the second inclined side surface are provided with reflective coatings.

In the at least one embodiment of the present disclosure, a rigidity coefficient of the prism holder is greater than rigidity coefficients of the first prism and the second prism.

In the at least one embodiment of the present disclosure, the prism holder is a reflecting prism made of glass, and the first prism and the second prism are plastic prisms.

The at least one embodiment of the present disclosure further provides an image acquisition module, including the foregoing compound prism module and two image cameras. The two image cameras are directly or indirectly fixed to the first prism and the second prism and respectively face the first light-emergent surface and the second light-emergent surface to acquire images.

In the at least one embodiment of the present disclosure, the compound prism module further includes: a lens holder, including a bottom plate and a vertical plate, where the vertical plate vertically extends from the bottom plate, the vertical plate is disposed on the bottom surface of the prism holder, to cause the first inclined side surface and the second inclined side surface to be perpendicular to the bottom plate, the first prism and the second prism are disposed on the bottom plate, to cause the first light-incident surface and the second light-incident surface to be perpendicular to the bottom plate, and the first reflecting surface and the second reflecting surface are combined with the prism holder.

The at least one embodiment of the present disclosure still further provides an image acquisition module, including the foregoing compound prism module and two image cameras. The two image cameras are fixed to the lens holder and respectively face the first light-emergent surface and the second light-emergent surface to acquire images.

In the at least one embodiment of the present disclosure, the lens holder further includes two holders extending from the bottom plate and respectively corresponding to the first light-emergent surface and the second light-emergent surface, and the two image cameras are respectively fixed to the holders.

In the present disclosure, two spliced prisms are replaced with an integrally formed biprism structure, thereby avoiding the problem of flare at a splicing position. In addition, in the at least one embodiment of the present disclosure, the prism holder made of a material with a relatively high rigidity coefficient is added, thereby avoiding deformation of the biprism structure and maintaining the flatness of the light-incident surfaces. Therefore, the biprism structure may be made of optical plastics with lower costs, thereby effectively reducing production costs.

DETAILED DESCRIPTION

Figure 1:
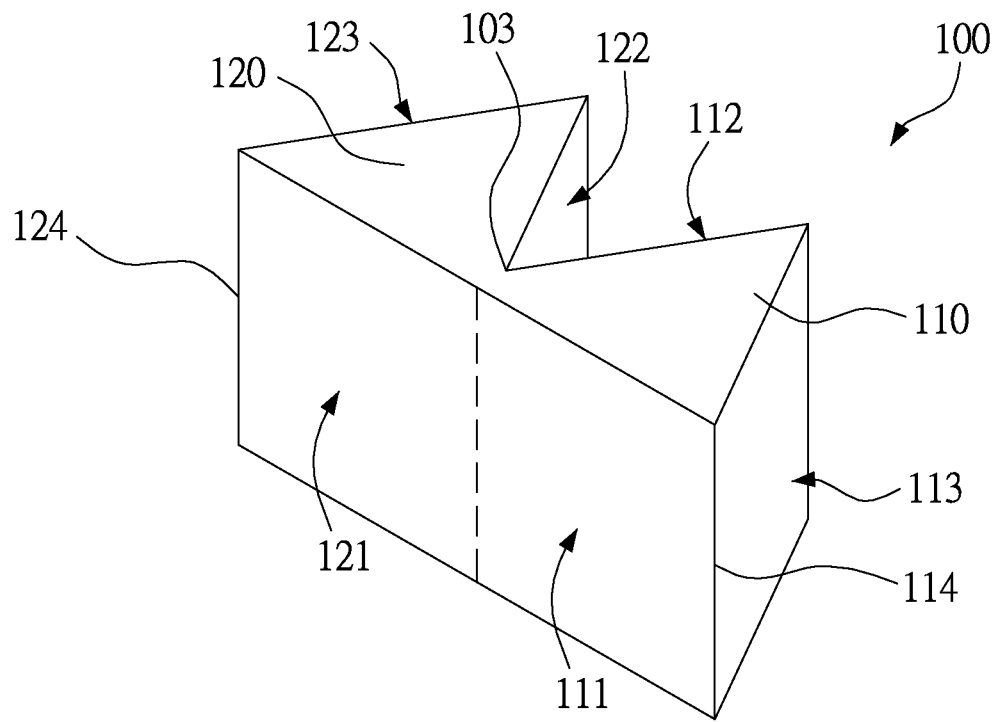
FIG. 1 is a three-dimensional view of a first prism and a second prism according to an embodiment of the present disclosure.
Figure 2:
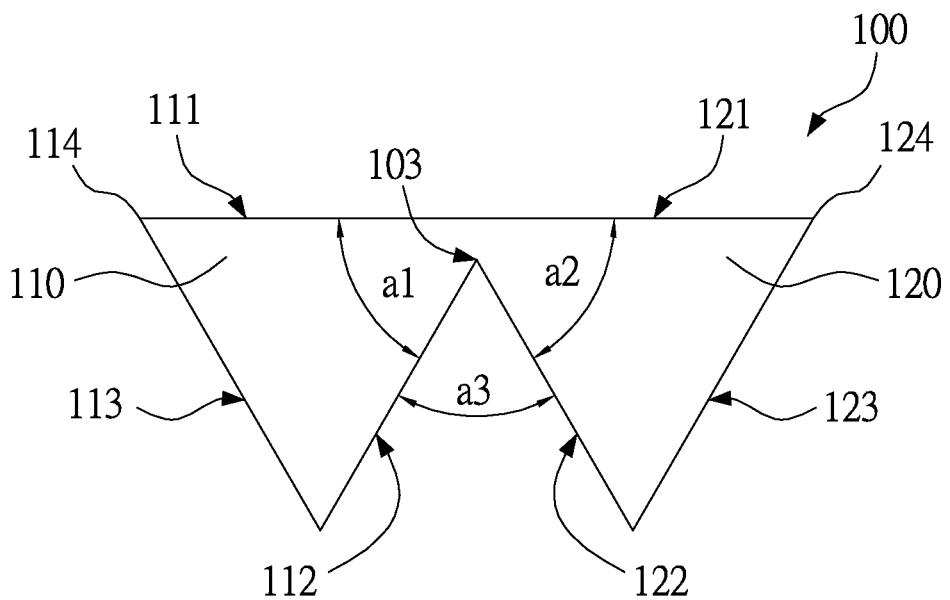
FIG. 2 is a top view of a first prism and a second prism according to an embodiment of the present disclosure.
Figure 3:
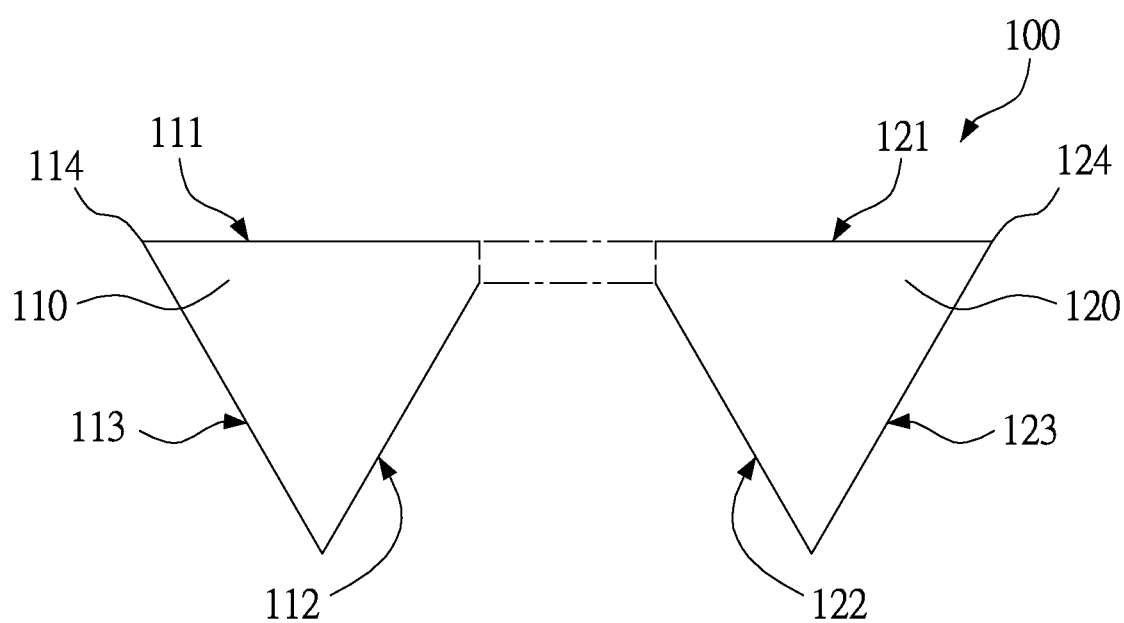
FIG. 3 is a top exploded view of a first prism and a second prism according to an embodiment of the present disclosure.

FIG. 1, FIG. 2, and FIG. 3 show a compound prism module 100 disclosed by the embodiments of the present disclosure. The compound prism module 100 is used for large-field-of-view image acquisition, so that two spliceable images are acquired to form a large-field-of-view image. The compound prism module 100 includes a first prism 110 and a second prism 120.

As shown in FIG. 1, FIG. 2, and FIG. 3, the first prism 110 includes a first light-incident surface 111, a first reflecting surface 112, and a first light-emergent surface 113 connected to each other. The first light-incident surface 111 and the first light-emergent surface 113 are connected to each other on a first side edge 114. The second prism 120 includes a second light-incident surface 121, a second reflecting surface 122, and a second light-emergent surface 123 connected to each other. The second light-incident surface 121 and the second light-emergent surface 123 are connected to each other on a second side edge 124.

As shown in FIG. 1, FIG. 2, and FIG. 3, the first light-incident surface 111 and the second light-incident surface 121 are connected to each other and are coplanar. The dashed line shown in FIG. 1 is used for marking the distinction between the first light-incident surface 111 and the second light-incident surface 121, and is not a line of a solid structure. The first reflecting surface 112 and the second reflecting surface 122 are connected to each other on a third side edge 103. In a specific embodiment, the first reflecting surface 112 and the second reflecting surface 122 are provided with reflective coatings to strengthen the reflection effect of the first reflecting surface 112 and the second reflecting surface 122 to avoid penetration of light rays. There is a spacing between the third side edge 103 and a connection between the first light-incident surface 111 and the second light-incident surface 121, and the first side edge 114 and the second side edge 124 are parallel to each other and far away from each other. That is, the first prism 110 and the second prism 120 are integrally formed to form a compound prism module 100 having a biprism structure.

In addition, as shown in FIG. 2, there is a first angle a1 between the first light-incident surface 111 and the first reflecting surface 112, there is a second angle a2 between the second light-incident surface 121 and the second reflecting surface 122, there is a third angle a3 between the first reflecting surface 112 and the second reflecting surface 122, and a sum of the first angle a1, the second angle a2, and the third angle a3 is 180 degrees.

Figure 4:
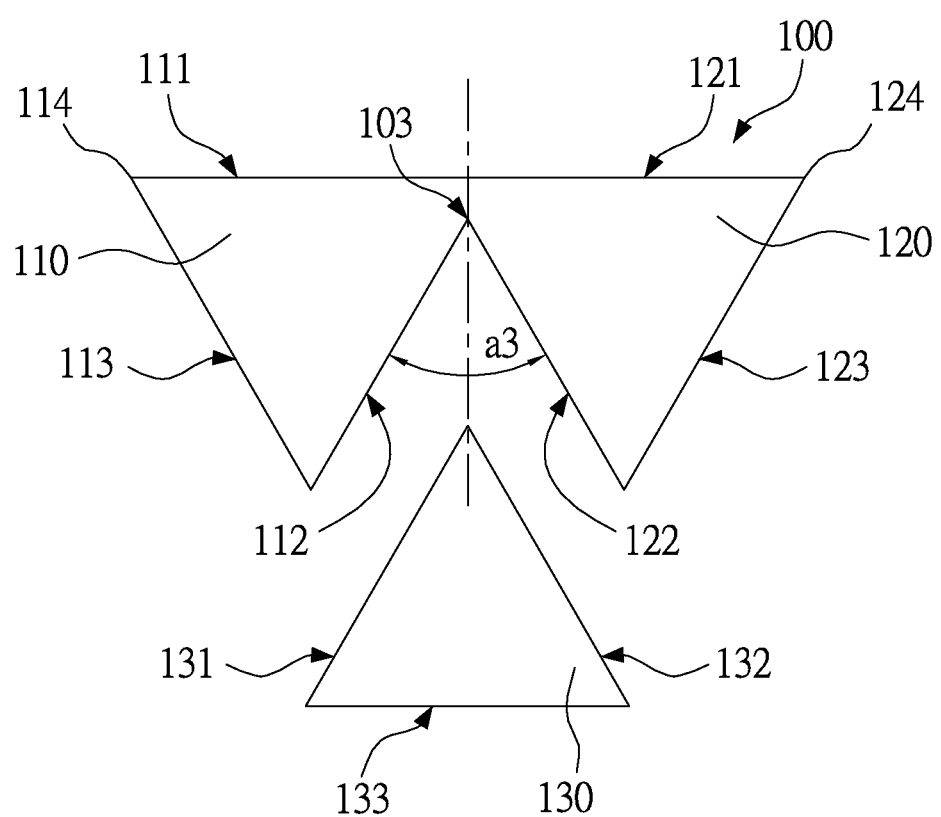
FIG. 4 is a top exploded view of a first prism, a second prism, and a prism holder according to an embodiment of the present disclosure.
Figure 5:
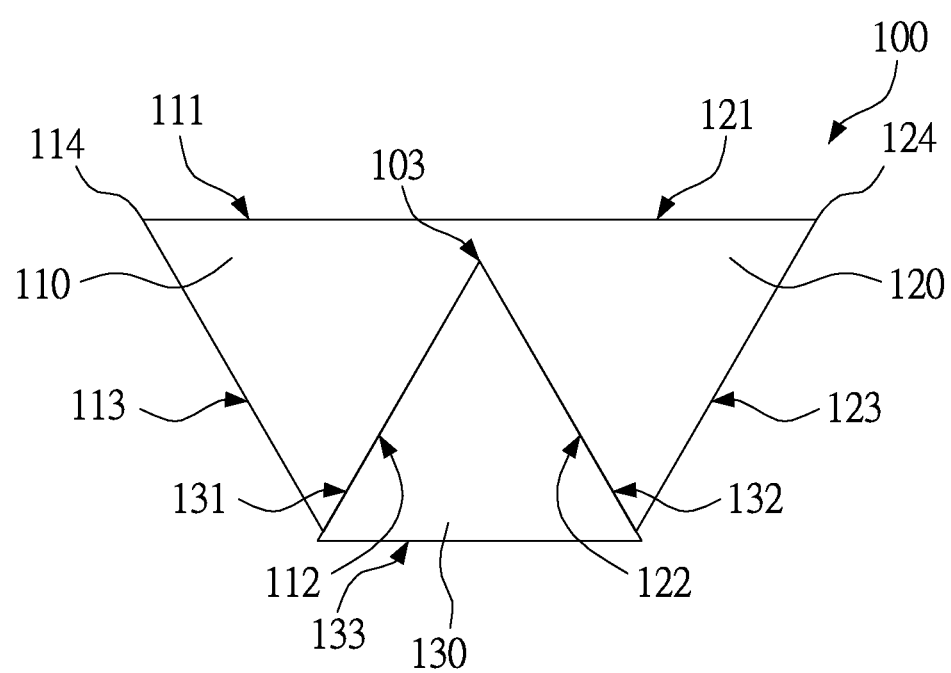
FIG. 5 is a top view of a first prism, a second prism, and a prism holder according to an embodiment of the present disclosure.

As shown in FIG. 4 and FIG. 5, to keep the first light-incident surface 111 and the second light-incident surface 121 coplanar without warpage or deformation of the plane, the compound prism module 100 in this embodiment of the present disclosure may further include a prism holder 130. The prism holder 130 includes a bottom surface 133 and a first inclined side surface 131 and a second inclined side surface 132 extending from two opposite side edges of the bottom surface 133. The second reflecting surface 122 is fixed to the second inclined side surface 132, and the first reflecting surface 112 is fixed to the first inclined side surface 131.

As shown in FIG. 4 and FIG. 5, the third angle a3 between the first reflecting surface 112 and the second reflecting surface 122 is equal to an angle between the first inclined side surface 131 and the second inclined side surface 132. By respectively combining the first reflecting surface 112 and the second reflecting surface 122 with the first inclined side surface 131 and the second inclined side surface 132, the third angle a3 may be maintained at a constant angle through the prism holder 130, so that the first light-incident surface 111 and the second light-incident surface 121 are kept coplanar. Therefore, in terms of configuration of material properties, the rigidity coefficient of the prism holder 130 may be configured to be greater than the rigidity coefficients of the first prism 110 and the second prism 120. For example, the prism holder 130 is a reflecting prism made of glass, and the first prism 110 and the second prism 120 are plastic prisms, thereby reducing the production costs of the first prism 110 and the second prism 120 while maintaining the form of the biprism structure by using the prism holder 130. The plastic material may be, but is not limited to, optical plastics, such as polymethyl methacrylate (PMMA, that is, acrylics), polystyrene (PS), polycarbonate (PC), and the like, that have low material costs and are easy to process.

In addition, the reflective coatings provided on the first reflecting surface 112 and the second reflecting surface 122 may alternatively be omitted, and the first inclined side surface 131 and the second inclined side surface 132 are provided with reflective coatings.

Figure 6:
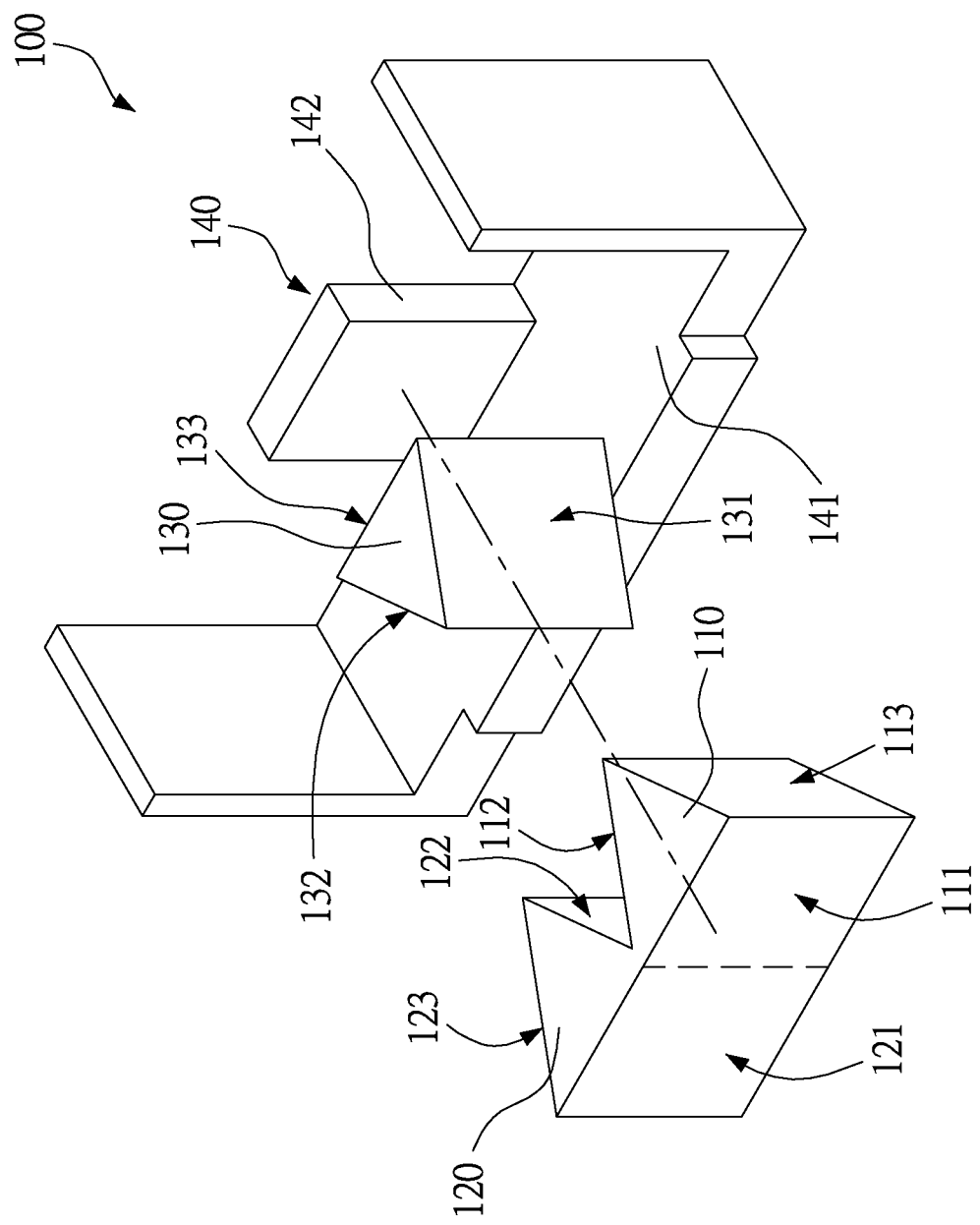
FIG. 6 is a three-dimensional exploded view of a first prism, a second prism, a prism holder, and a lens holder according to an embodiment of the present disclosure.
Figure 7:
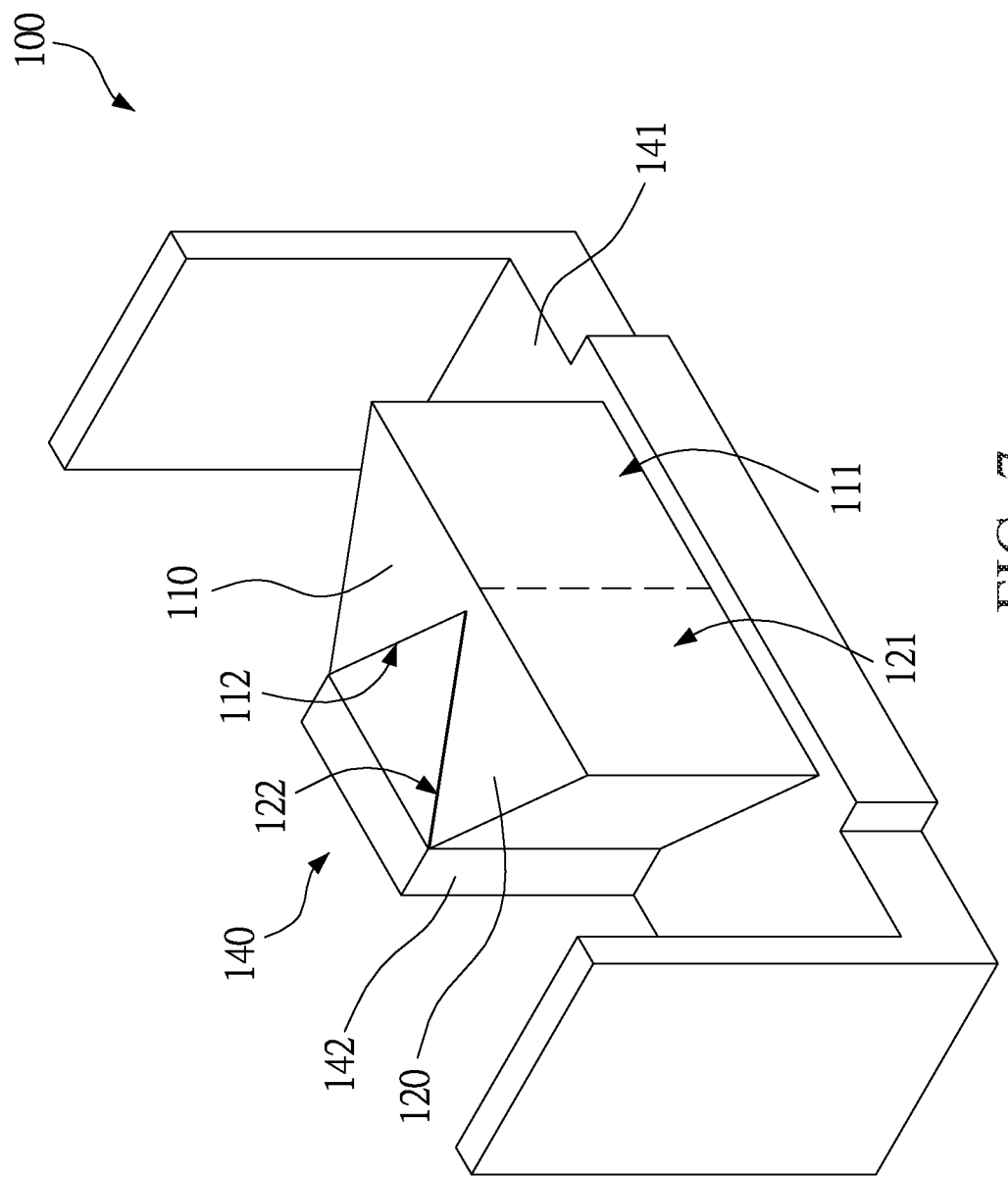
FIG. 7 is a three-dimensional view of a first prism, a second prism, a prism holder, and a lens holder according to an embodiment of the present disclosure.

As shown in FIG. 6 and FIG. 7, the compound prism module 100 in the embodiments of the present disclosure may further include a lens holder 140. The lens holder 140 includes a bottom plate 141 and a vertical plate 142. The vertical plate 142 vertically extends from the bottom plate 141. The vertical plate 142 is disposed on the bottom surface 133 of the prism holder 130, so that the first inclined side surface 131 and the second inclined side surface 132 are perpendicular to the bottom plate 141. The first prism 110 and the second prism 120 are disposed on the bottom plate 141, so that the first light-incident surface 111 and the second light-incident surface 121 are perpendicular to the bottom plate 141, and the first reflecting surface 112 and the second reflecting surface 122 are combined with the prism holder 130.

Figure 8:
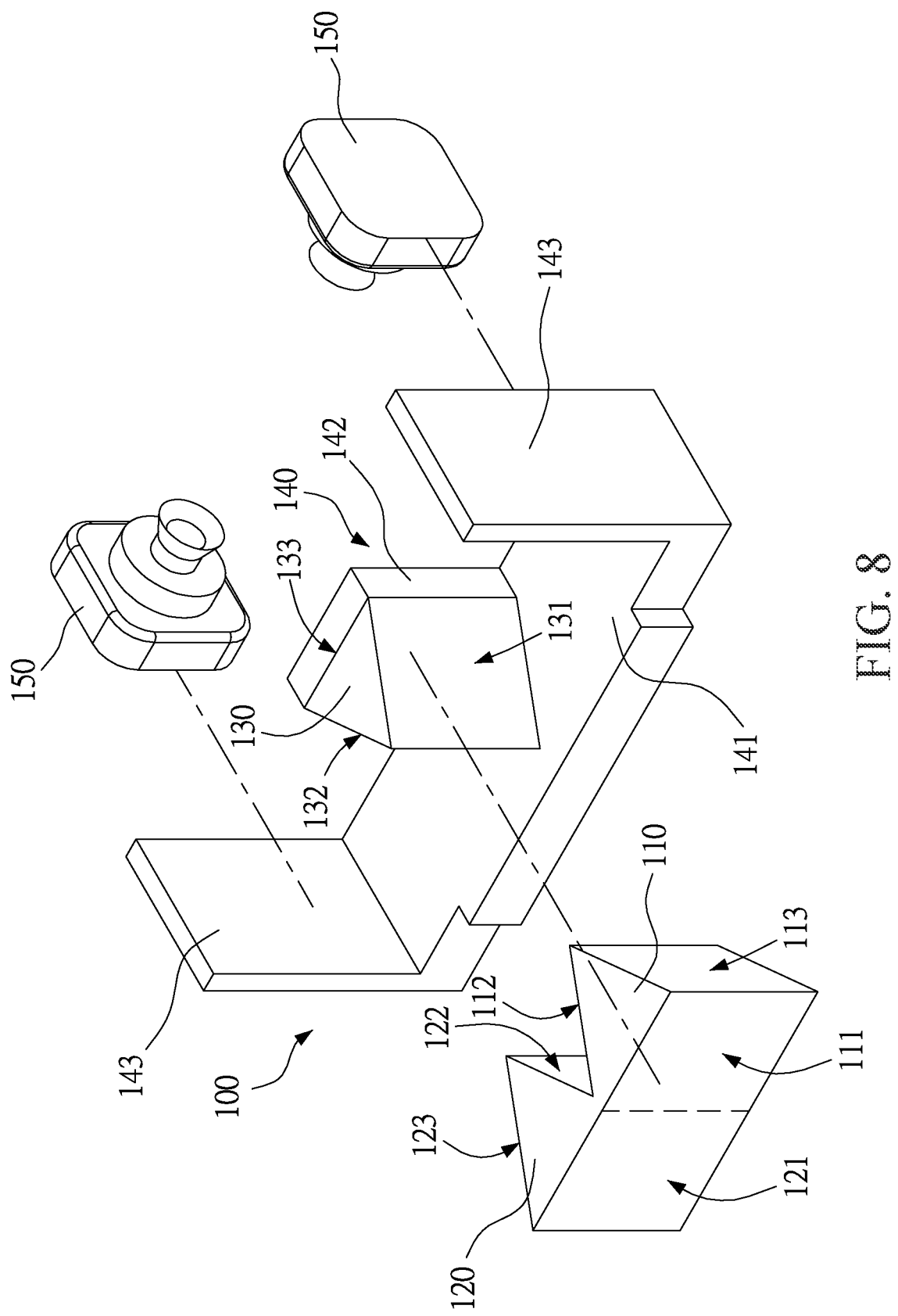
FIG. 8 is a three-dimensional exploded view of an image acquisition module according to an embodiment of the present disclosure.
Figure 9:
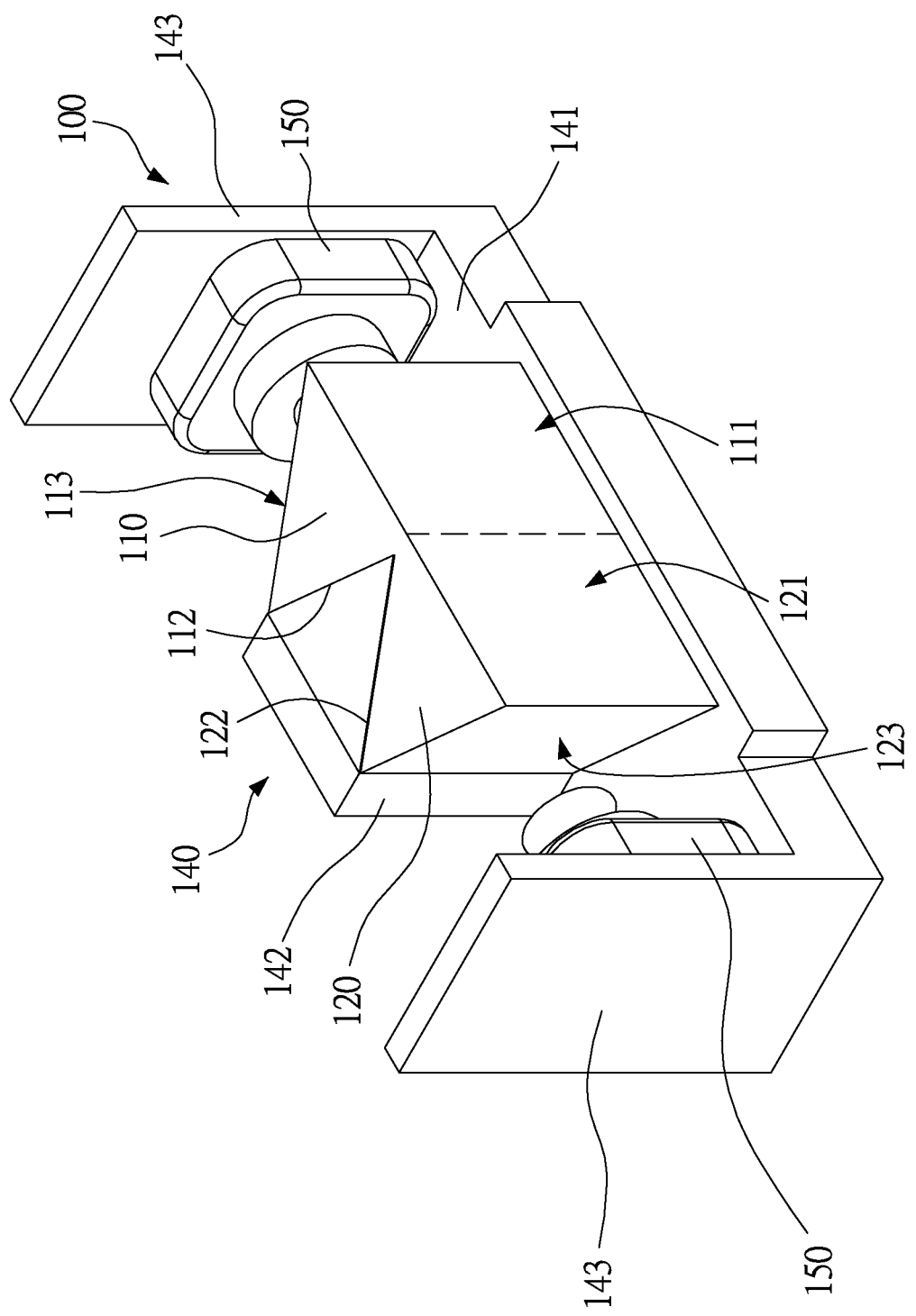
FIG. 9 is a three-dimensional view of an image acquisition module according to an embodiment of the present disclosure.

As shown in FIG. 8 and FIG. 9, based on the compound prism module 100, the embodiments of the present disclosure further provide an image acquisition module including the compound prism module 100 and two image cameras 150. The image cameras 150 are directly or indirectly fixed to the first prism 110 and the second prism 120 and respectively face the first light-emergent surface 113 and the second light-emergent surface 123 to acquire images. In this embodiment of the present disclosure, the two image cameras 150 are fixed to the lens holder 140 and indirectly fixed to the first prism 110 and the second prism 120. As shown in the figure, the lens holder 140 further includes two holders 143 respectively extending from the bottom plate 141. The two image cameras 150 are respectively fixed to the holders 143. In different embodiments, the holders 143 may extend from the vertical plate 142. In different embodiments, each image camera 150 has an extension structure for connecting to the first prism 110 or the second prism 120, so that the two image cameras 150 are directly fixed to the first prism 110 and the second prism 120.

Figure 10:
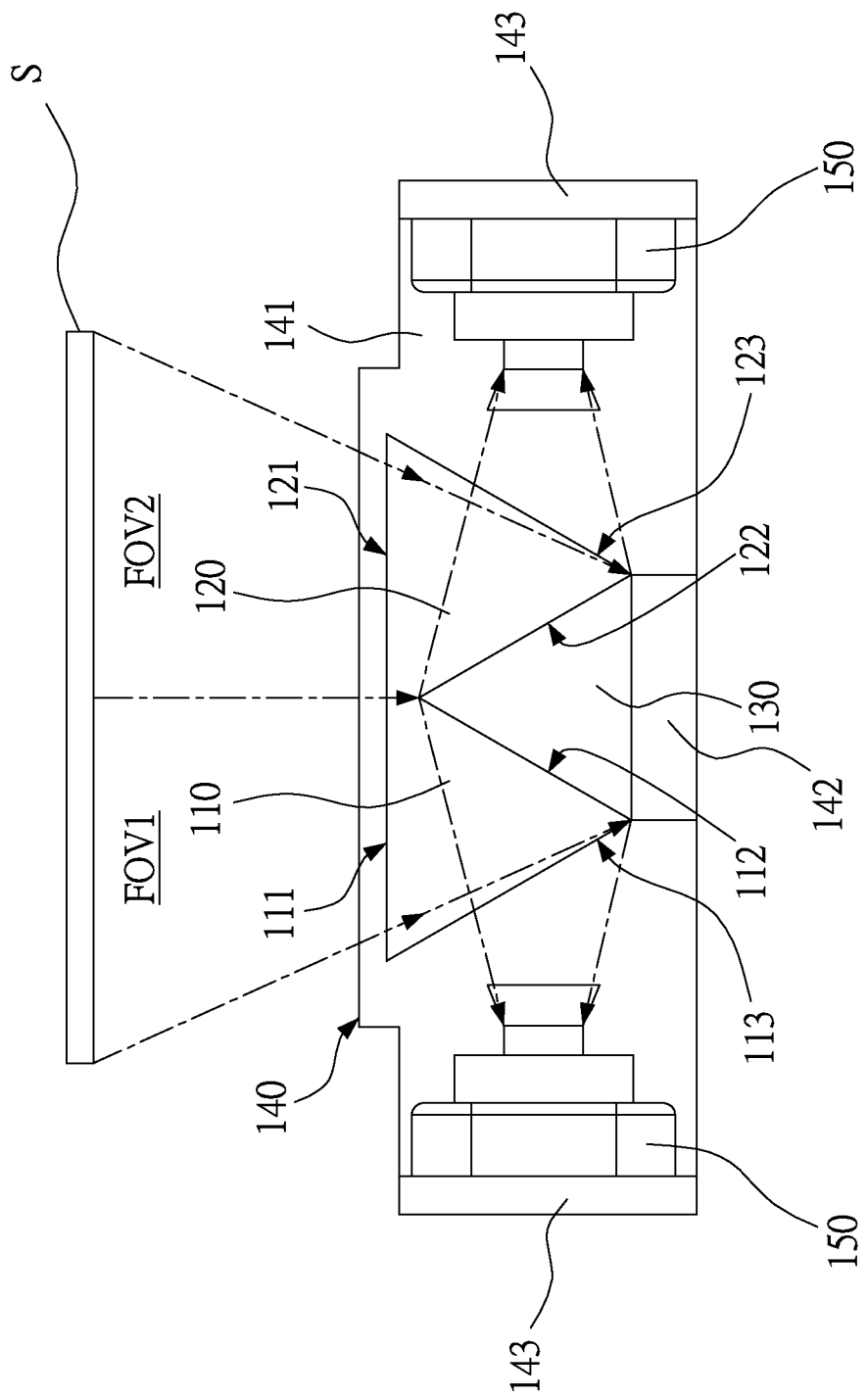
FIG. 10 is a top view of an image acquisition module according to an embodiment of the present disclosure.

Referring to FIG. 10, the first prism 110 and one image camera 150 form a periscope set. The first prism 110 is combined with the image camera 150, so that the first prism 110 has a first field-of-view FOV1 in front of the first light-incident surface 111. The second prism 120 and the other image camera 150 form another periscope set. The second prism 120 is combined with the image camera 150, so that the second prism 120 has a second field-of-view FOV2 in front of the second light-incident surface 121. The matching of the two periscope sets allows the compound prism module 100 to obtain an equivalent field-of-view with a relatively wide angle. The equivalent field-of-view may be equal to FOV1+FOV2 or slightly smaller than FOV1+FOV2. In a case that the equivalent field of view is equal to FOV1+FOV2, the two image cameras 150 respectively acquire images of half a target scene S. The two images may be spliced by a data processing circuit on a backend into an equivalent image including a complete target scene S. In a case that the equivalent field of view is smaller than FOV1+FOV2, images respectively acquired by the two image cameras 150 are slightly larger than half the target scene S. That is, the images respectively acquired by the two image cameras 150 partially overlap each other. The two images may be spliced by a data processing circuit on a backend to form an equivalent image including a complete target scene S after the partially overlapping part is cropped.

In the present disclosure, two spliced prisms are replaced with the integrally formed biprism structure, thereby avoiding the problem of flare at a splicing position. In addition, in the at least one embodiment of the present disclosure, the prism holder 130 made of a material with a relatively high rigidity coefficient is added, thereby avoiding deformation of the biprism structure and maintaining the flatness of the light-incident surfaces. Therefore, the biprism structure may be made of optical plastics with lower costs, thereby effectively reducing production costs.

What is claimed is:

1. A compound prism module, comprising:
    a first prism, comprising a first light-incident surface, a first reflecting surface, and a first light-emergent surface connected to each other, wherein the first light-incident surface and the first light-emergent surface are connected to each other on a first side edge;
    a second prism, comprising a second light-incident surface, a second reflecting surface, and a second light-emergent surface connected to each other, wherein the second light-incident surface and the second light-emergent surface are connected to each other on a second side edge, and
    the first prism and the second prism are integrally formed, the first light-incident surface and the second light-incident surface are connected to each other and are coplanar, the first reflecting surface and the second reflecting surface are connected to each other on a third side edge, there is a spacing between the third side edge and a connection between the first light-incident surface and the second light-incident surface, and the first side edge and the second side edge are parallel to each other and far away from each other;
    a prism holder, comprising a bottom surface and a first inclined side surface and a second inclined side surface extending from two opposite side edges of the bottom surface, wherein the second reflecting surface is fixed to the second inclined side surface, and the first reflecting surface is fixed to the first inclined side surface; and
    a lens holder, comprising a bottom plate and a vertical plate, wherein the vertical plate vertically extends from the bottom plate, the vertical plate is disposed on the bottom surface of the prism holder, to cause the first inclined side surface and the second inclined side surface to be perpendicular to the bottom plate, the first prism and the second prism are disposed on the bottom plate, to cause the first light-incident surface and the second light-incident surface to be perpendicular to the bottom plate, and the first reflecting surface and the second reflecting surface are combined with the prism holder.

2. The compound prism module according to claim 1, wherein
    the first reflecting surface and the second reflecting surface are provided with reflective coatings to strengthen the reflection effect.

3. The compound prism module according to claim 1, wherein
    there is a first angle between the first light-incident surface and the first reflecting surface, there is a second angle between the second light-incident surface and the second reflecting surface, there is a third angle between the first reflecting surface and the second reflecting surface, and a sum of the first angle, the second angle, and the third angle is 180 degrees.

4. The compound prism module according to claim 1, wherein the third angle between the first reflecting surface and the second reflecting surface is equal to an angle between the first inclined side surface and the second inclined side surface.

5. The compound prism module according to claim 1, wherein the first inclined side surface and the second inclined side surface are provided with reflective coatings.

6. The compound prism module according to claim 1, wherein
a rigidity coefficient of the prism holder is greater than rigidity coefficients of the first prism and the second prism.

7. The compound prism module according to claim 6, wherein
the prism holder is a reflecting prism made of glass, and the first prism and the second prism are plastic prisms.

8. An image acquisition module, comprising:
the compound prism module according to claim 1; and
two image cameras, directly or indirectly fixed to the first prism and the second prism, and respectively facing the first light-emergent surface and the second light-emergent surface to acquire images.

9. The compound prism module according to claim 8, wherein the first reflecting surface and the second reflecting surface are provided with reflective coatings.

10. The compound prism module according to claim 8, wherein
there is a first angle between the first light-incident surface and the first reflecting surface, there is a second angle between the second light-incident surface and the second reflecting surface, there is a third angle between the first reflecting surface and the second reflecting surface, and a sum of the first angle, the second angle, and the third angle is 180 degrees.

11. The compound prism module according to claim 8, wherein
the third angle between the first reflecting surface and the second reflecting surface is equal to an angle between the first inclined side surface and the second inclined side surface.

12. The compound prism module according to claim 8, wherein the first inclined side surface and the second inclined side surface are provided with reflective coatings.

13. The compound prism module according to claim 8, wherein
a rigidity coefficient of the prism holder is greater than rigidity coefficients of the first prism and the second prism.

14. The compound prism module according to claim 13, wherein
the prism holder is a reflecting prism made of glass, and the first prism and the second prism are plastic prisms.

15. An image acquisition module, comprising:
the compound prism module according to claim 1; and
two image cameras, fixed to the lens holder, and respectively facing the first light-emergent surface and the second light-emergent surface to acquire images.

16. The image acquisition module according to claim 15, wherein the lens holder further comprises two holders extending from the bottom plate and respectively corresponding to the first light-emergent surface and the second light-emergent surface, and the two image cameras are respectively fixed to the holders.

* * * * *